United States Patent [19]

Ratliff et al.

[11] Patent Number: 4,887,231
[45] Date of Patent: Dec. 12, 1989

[54] DETERMINATION OF TURBINE BLADE CROSS-SECTIONAL AREA

[75] Inventors: Phillip R. Ratliff, Winston-Salem, N.C.; George A. Bises, Winter Springs, Fla.

[73] Assignee: Westinghouse Electric Corp., Pittsburgh, Pa.

[21] Appl. No.: 137,701

[22] Filed: Dec. 24, 1987

[51] Int. Cl.$^4$ .................. G01F 17/00; G01G 5/02
[52] U.S. Cl. .................. 364/564; 364/567; 73/149; 73/865.8
[58] Field of Search .............. 364/560, 564, 567, 505; 73/149, 865.8

[56] References Cited

U.S. PATENT DOCUMENTS

| 1,901,687 | 3/1933 | Zook | 73/149 |
|---|---|---|---|
| 2,851,881 | 9/1958 | Daniel et al., | 73/149 |
| 3,769,834 | 11/1973 | Fletcher et al. | 73/149 |
| 4,144,749 | 3/1979 | Whitmore | 73/149 |
| 4,184,371 | 1/1980 | Brachet | 73/149 X |
| 4,196,618 | 4/1980 | Patterson | 73/149 |
| 4,287,760 | 9/1981 | Kubo et al. | 73/149 |

FOREIGN PATENT DOCUMENTS

| 0010721 | 1/1986 | Japan | 73/149 |
|---|---|---|---|
| 254129 | 3/1970 | U.S.S.R. | 73/149 |
| 430285 | 11/1974 | U.S.S.R. | 73/149 |
| 587335 | 1/1978 | U.S.S.R. | 73/149 |

*Primary Examiner*—Parshotam S. Lall
*Assistant Examiner*—Joseph L. Dixon

[57] ABSTRACT

Methods and apparatus for determining a profile of cross-sectional areas of a turbine blade. The cross-sectional area between two selected points along the length of the blade is determined by calculating the changes in the buoyant force exerted upon the blade as the blade is immersed into a volume of water contained in a tank.

6 Claims, 2 Drawing Sheets

DETERMINATION OF TURBINE BLADE CROSS-SECTIONAL AREA

BACKGROUND OF THE INVENTION

This invention relates generally to the determination of turbine blade cross-sectional area, and more particularly to a method and apparatus for continuously determining the cross-sectional area of tapered twisted turbine blades along their lengths.

As is well known, the natural frequency of vibration in turbine blades and disks utilized in turbomachinery depends not only upon the size and shape of the particular blade or disk, but also upon its mode of vibration. Since this natural frequency of vibration may be typically on the order of 500 to 1000 Hertz, a number of reversals (i.e., fluctuating stress cycles) may be experienced thereby quickly reaching the fatigue limits of most conventional materials used in such turbomachinery. For example, it would not be unlikely to encounter $10^6$ fluctuating stress cycles per hour.

In conditions of extreme centripetal loading, such as in the operation of a conventional steam turbine, mechanical damping of the blades and disk assembly is most often provided by the material of the blades and disk assembly, as well as aerodynamic damping. Moreover, if a blade or disk assembly is excited at a frequency that closely approximates one of its fundamental natural frequencies, large amplitudes of vibration and, thus, high vibratory stress can result thereby leading to fatigue failure of the blade or disk assembly. Such excitations are desirably avoided since they can further lead to the requirement for expensive blade de-tuning in those cases where severe vibratory stresses are discovered during the manufacture of blade prototypes.

Prior to the introduction of "freestanding" turbine blades, turbine blades were typically attached one to the other at intermittent points along their lengths. As a result, the ranges of their natural frequencies of vibration did not pose much of a problem. However, with the advent of "freestanding" blades (i.e., blades which are not attached to adjacent blades except through the rotor attachment), concern for the vibratory characteristics of each individual blades has grown. Such concern is of particular importance in turbine blades of the tapered twisted configuration which have an extremely complex blade geometry, since the mass distribution along the length of such blades may affect the blade's basic strength and its ability to withstand stress induced by vibration, as well as its basic vibrational characteristics.

In order to minimize the problems associated with such vibration-induced stress, manufacturers in the past have paid strict attention to the quality control of blade sizing. One method currently in use by the assignee of the present invention is referred to generally as "pantoscribing", and consists of meticulously tracing around the airfoil profile of the blade at selected points along its length. This can be accomplished by rotating the blade about its centroidal axis, determining the area within a given airfoil profile at a plurality of selected points, plotting such determined areas relative to their positions along the blade length, and thereafter assuming that the area distribution between any given pair of points changes in a linear manner.

The above described method presents certain obvious problems. First, the method of tracing a blade airfoil is an extremely slow process. For example, in spite of the fact that only a few cross-sectional area data points must be obtained for any given blade, the tracing process of a single, average-size blade over its entire length can take several hours. As a result, only a very limited sample of a given production set of blades may be measured. Not only does such a process become time consuming, but it also increases the probability of manufacturing defective turbine blades due to the size of the statistically small sample group. Second, as was mentioned herein above with respect to the description of the pantoscribing method, an assumption is made that the area distribution between any given pair of points changes (i.e., decreases radially) in a linear manner. As is obviously the case, the chance that any manufactured blade has a cross-sectional area distribution which varies linearly is remote.

SUMMARY OF THE INVENTION

Accordingly, it is a general object of the present invention to provide a method and apparatus for determining the cross-sectional area of a turbine blade. More specifically, it is an object of the present invention to provide a method and apparatus for continuously determining the cross-sectional area of a turbine blade along its entire length.

Another object of the present invention is to provide a method and apparatus for continuously determining the cross-sectional area distribution of a turbine blade having a complex shape.

Still another object of the present invention is to provide a method and apparatus for continuously determining the cross-sectional area distribution of a tapered twisted turbine blade along its entire length.

A further object of the present invention is to provide a quality control method and apparatus for reducing the number of manufactured blades having the potential for large vibration-induced stress.

Still a further object of the present invention is to provide a method and apparatus for increasing production output of turbine blades.

Briefly, these and other objects according to the present invention are accomplished by a method incorporating the well-known Archimedean principle. A tank is filled with a volume of liquid much greater than the volume of a typical blade to be measured. The blade is then slowly immersed into the tank at a constant velocity while the length of the blade is continuously monitored. As is known, the buoyancy force of an object is the resultant vertical force exerted on the object by a static fluid in which the object is submerged or floating. Therefore, a determination of the volume change rate may be determined from the rate of change in weight of the volume of fluid that the blade has displaced, which when properly combined with a measure of the length of the blade will continuously provide the cross-sectional area of the blade along its length.

The above and other objects, advantages and novel features according to the present invention will become more apparent from the following detailed description of a preferred embodiment when considered in conjunction with the accompanying drawings wherein:

DETAILED DESCRIPTION OF THE INVENTION

Figure 1:
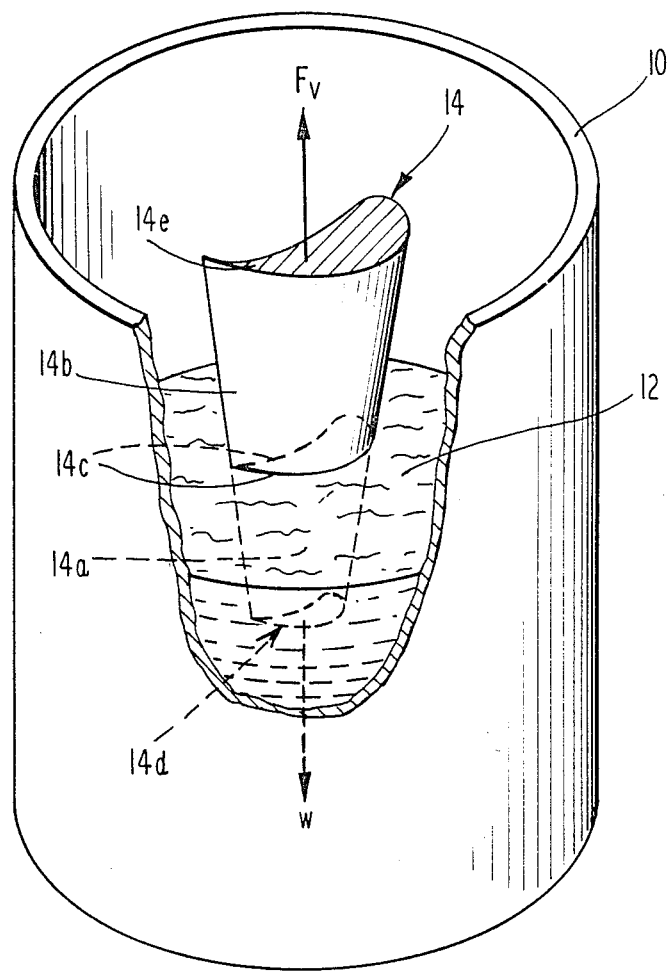
FIG. 1 diagrammatically illustrates the forces acting upon a section of a tapered twisted turbine blade being immersed in a tank containing a liquid to determine the cross-sectional area of the blade along its length.

Referring now to the drawings, wherein like characters designate like or corresponding parts throughout the several views, there is shown in FIG. 1 a cutaway view of a tank 10, containing a liquid 12, into which a tapered twisted turbine blade 14 is immersed to determine its cross-sectional area in accordance with the present invention. As is readily apparent from FIG. 1, the blade 14 is partially submerged into the liquid 12, having a first submerged portion 14a and a second floating portion 14b separated each from the other by an interstitial portion 14c. The interstitial portion 14c represents that section of the blade 14 which is cut by the level of the liquid 12 within the tank 10.

As is well known, the cross-sectional area of a free-standing turbine blade, such as the tapered twisted blade 14 shown in FIG. 1, changes continuously along its length from its tip portion 14d to its root portion 14e. Therefore, any given volume section of the blade 14 is related to the cross-sectional area and length of the blade 14 by the equation:

$$V = \int_{y_1}^{y_2} A_c \, dy \qquad (1)$$

where $y_1$ and $y_2$ are length parameters, $A_c$ is the cross-sectional area of the blade as a function of its length y, and V is the total volume contained within the section.

From the Fundamental Theorem of Calculus, it is also known that if $A_c$ is a continuous function of y, as in the case of the tapered twisted turbine blade 14, then:

$$\left. \frac{dV}{dy} \right|_{y^*} = A_c(y^*) \qquad (2)$$

Therefore, the cross-sectional area of the blade 14 at any point y* along its length may be determined by solving the volume derivative shown in equation (2). This first derivative may be approximated by noting that:

$$\left. \frac{dV}{dy} \right|_{y^*} = \lim_{\Delta y \to 0} \frac{\Delta V}{\Delta y} = \lim_{\Delta \to 0} \frac{V(y_2) - V(y_1)}{y_2 - y_1} \qquad (3)$$

The above described relationships of the cross-sectional area of a tapered twisted turbine blade to its length may be appropriately utilized according to one important aspect of the present invention when considered in conjunction with the well-known Archimedean principle (i.e., the principle that a body immersed in a fluid undergoes an apparent loss in weight equal to the weight of the fluid it displaces). This apparent loss in weight, or buoyancy, is due to the resultant force exerted upwardly on the body by the static fluid within which it is submerged or floating. Therefore, it is apparent that by determining the equivalent volume change rate of the blade 14, one may conveniently and continuously determine the cross-sectional area of the blade 14 along its length.

The above stated proposition may be explained as follows. From basic fluid mechanics principles, it is known that the rate of change of hydrostatic pressure with depth is given for a static fluid by the equation:

$$\frac{dp}{dh} = \rho g \qquad (4)$$

where $\rho$ is the density of the fluid, and g is the local gravitational acceleration. Assuming then that $\rho$ is constant, the pressure p may be defined by the relationship:

$$p = P_{atm} + \rho g h \qquad (5)$$

where patm is the atmospheric pressure and h represents the depth below the surface of the fluid.

Since an element of unit volume dV can be represented as $dA(h_2-h_1)$, and since the change in the buoyancy $F_v$ is related by the equation:

$$dF_v = (P_{atm} + \rho g h_2)dA - \frac{(P_{atm} + \rho g h_1)dA =}{\rho g(h_2 - h_1)dA} \qquad (6)$$

the change in the buoyancy $F_v$ is further related to the volumetric change of the portion of the blade 14 that is immersed into the fluid 12, such that:

$$dF_v = \rho g dV, \qquad (7)$$

or, $$dw = dF_v = \rho g dV. \qquad (8)$$

Accordingly, by measuring the changes in weight of the blade 14 (dW) as it is immersed into the fluid 12, one can use the relationship described by equation (8) to determine the equivalent volume change rate of the blade 14, which when properly combined with a measure of the length of the blade 14 will provide a continuous determination of the cross-sectional area of the blade 14 along its length.

Figure 2:
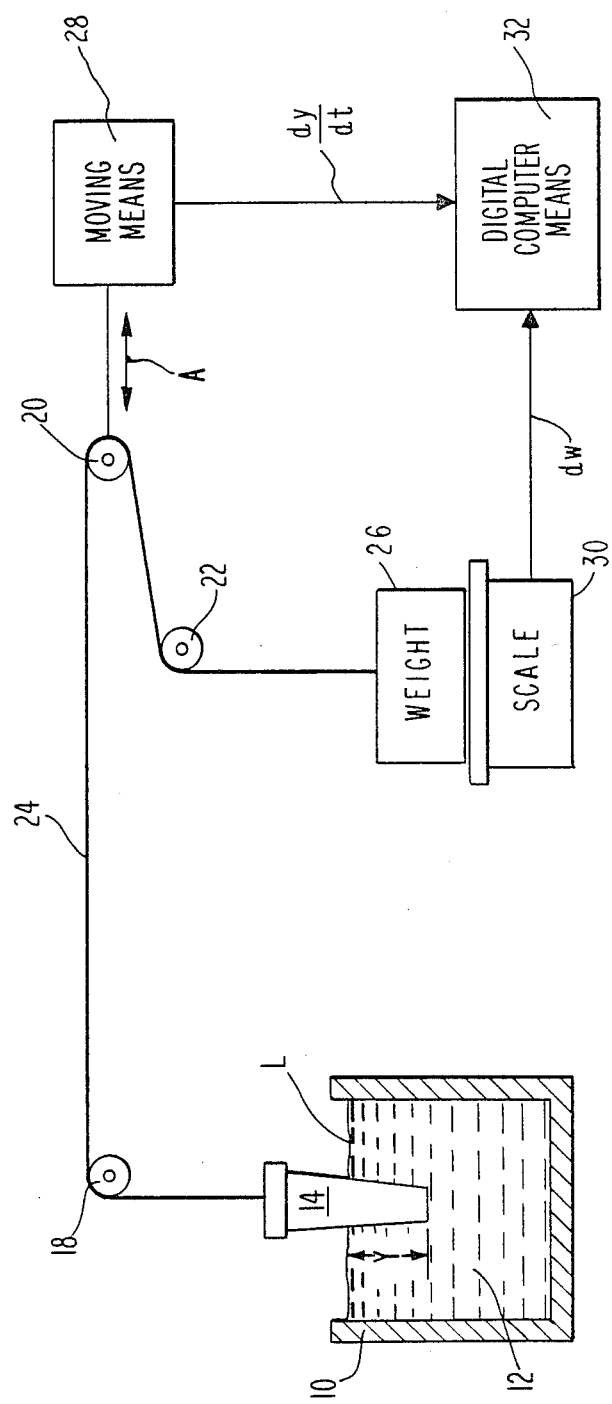
FIG. 2 illustrates apparatus, according to a preferred embodiment of the present invention, for continuously determining the cross-sectional area of the tapered twisted turbine blade shown in FIG. 1.

Referring now to FIG. 2, apparatus will now be described for continuously determining the cross-sectional area of a tapered twisted turbine blade in accordance with a presently preferred embodiment of the invention. It should be noted at this juncture that the apparatus described herein was developed with several criteria in mind. That is, any apparatus for continuously determining the cross-sectional area of a tapered twisted turbine blade must be capable of handling turbine blades having lengths ranging from approximately 5 inches to approximately 45 inches, airfoil cross-sectional area ranging from approximately 0.1 to approximately 2.0 square inches, and variations in cross-sectional areas from minimum material condition to maximum material condition of approximately plus or minus ten percent (10%) from nominal. Furthermore, the method must be fast and accurate (e.g., on the order of approximately five minutes per blade), the devices used in such apparatus should be industry standard, and the fluid 14 used in such apparatus must be environmentally safe to prevent adverse effects on the material properties of the blades. For example, no chlorides should be present within the fluid 14 to be used.

As shown in FIG. 2, the tank 10 is filled with a fluid 12 (e.g., water) to a level L thereby containing a volume of fluid substantially greater than the volume of a blade 14 to be measured. Water is preferred since its density relative to the blade 14 (i.e., 15% of the density of the blade 14) permits the blade 14 to be buoyed upward, but any fluid 12 having a smaller relative density may be equally utilized in accordance with the present invention. The blade 14 is suspended by means for slowly immersing the blade 14 within the fluid 12. The immersion means consists generally of three pulleys 18, 20, and 22 around which is led a wire 24 attached between the blade 14 to be immersed and a weight 26 corresponding to the actual weight of the blade 14. Alternatively, the weight 26 can be greater than the weight of the blade to ensure that the immersion of the blade 14 into the fluid 14 will not pull the weight 26 upwardly. The immersion means further consists of means 28 for moving the pulley 20 such that the blade 14 is immersed into the fluid 12 and withdrawn therefrom upon completion of the method. Pulleys 18 and 22 remain stationary throughout the immersion of the blade 14 into the fluid 12.

In order to determine the apparent change in weight dW of the blade 14 due to the buoyancy force, a scale 30 is used to support the weight 26, inputting a signal corresponding to the change in weight per unit time (i.e., dW/dt) to computer means 32. The apparent change in weight of the blade per unit time dW/dt (or simply dW, if the blade is incrementally immersed into the tank) is inputted into the compouter means along with dy/dt (or simply dy for incremental steps of immersion). The quotient of dW/dt and dy/dt is proportional to the cross-sectional area Ac(y*):

$$\frac{dW/dt}{dy/dt} = \rho g \frac{dV/dt}{dy/dt} \approx \rho g \, Ac(y^*) \qquad (9)$$

By solving this equation for Ac(y*), the computer determines the cross-sectional area of the blade 14 for incremental changes along a length y of the blade 14 which is immersed into the fluid 12. For example, when the blade 14 is first immersed, a cross-sectional area cannot be determined until an incremental change dy occurs in the amount of the blade 14 which is immersed. Successive, or a plurality of cross-sectional areas may thereafter be determined as the blade 14 is continually immersed. A selection of different points along the length of the blade 14 may be made to get different areas, or a continuous analog profile of cross-sectional areas is achievable through continuous immersion of the blade 14, equation (9) being calculated at selected intervals along the length of the blade 14.

The method can similarly be practiced by incrementally immersing the blade in steps, i.e., the moving means moves the blade dy into the fluid, and inputs dy to the computer means, which also tracks y*. The scale 30 inputs a new weight representative of the change in displaced fluid volume, from which dw is computed. Then, A(y*) is calculated as follows:

$$A(y^*) = \frac{dW}{dy \cdot \rho g} \qquad (60)$$

The computer means 32 may be suitably programmed according to the present invention with the above described equation (9) such that upon determination, as a function of y, of the total volume of fluid 12 displaced by the blade 14 through means of the scale 30 and moving means 28, the first derivative at any y* along the length of the blade 14 may be derived thereby yielding the cross-sectional area of the blade 14 at y*. While digital computer means 32 is shown in FIG. 2, it should be noted at this juncture that analog computer means could equally be used. For example, since a time dependent signal/voltage representing the rate of change in weight of the blade 14 per unit time can be easily calculated by analog computer means having a differentiating circuit, the digital computer means 32 may be readily substituted with such an analog computer means.

While a particular embodiment of the invention has been shown and described, various modifications are within the true spirit and scope of the invention. For example, the blade 14 could merely be suspended within an empty tank 10 while the fluid 12 is being introduced into the tank. Under such circumstances, all three pulleys 18, 20 and 22 would remain stationary throughout. Care must be taken, however, when the fluid 12 is introduced into the tank 10 in order to avoid turbulence within the tank 10, and in order to permit a sufficient amount of time for any instabilities caused by turbulence to dampen out. The blade 14, in either case, should not "float" but should transmit the entire buoyant force up through the immersion means 16. The appended claims are, therefore, intended to cover all such modifications. The step of immersing the turbine blade or body into a tank of fluid may thus comprise the technique as illustrated in the figures, or immersion by raising the fluid level relative to the blade or body.

We claim as our invention:

1. A method of determining a profile of cross-sectional area of a three-dimensional body having a complex shape, comprising the steps of:
   immersing the body in a tank containing a volume of a static fluid, the body being immersed at a predetermined rate corresponding to a change in unit length of immersion per unit time, wherein said immersing step comprises the steps of:
   providing means for moving the body;
   providing means for suspending the body from the moving means, wherein said suspending means comprises:
   a wire attached at one end thereof to the body;
   a weighted object corresponding to at least an actual weight of the body, said weighted object being attached to the other end of said wire; and
   pulley means attached to said moving means, said wire being led through said pulley means to transmit the motion of said moving means to the body; and
   activating said moving means to immerse the body suspended into said tank at said predetermined rate;
   measuring a change in the body buoyancy representative of the change in the body volume displaced by the body for each unit time as the body is immersed within said tank;
   inputting said measured change and said predetermined rate to means for calculating a quotient of the former divided by the latter;
   calculating said quotient for each unit time; and
   providing an output from said quotients corresponding to said profile of cross-sectional areas.

2. The method according to claim 1, wherein said weighted object is stationary.

3. The method according to claim 2, wherein said measuring step comprises the steps of:

providing a scale including means for outputting a change in weight;

disposing said weighted object upon said scale;

determining an apparent change in the weight of the body as it is immersed in said tank, said apparent change corresponding to said change in said volume displaced per unit time.

4. Apparatus for determining the cross-sectional area of selected points along a three-dimensional body having a complex shape, comprising:

a tank containing a volume of fluid;

means for immersing the body into said tank at a predetermined rate so that successive ones of said points are immersed into said fluid, wherein said immersing means comprises:

means for moving the body;

means for suspending the body from said moving means, said suspension means including a wire attached at one end thereof to the body, a weighted object corresponding to at least the actual weight of the body, said weighted object being attached to the other end of said wire, and pulley means attached to said moving means, said wire being led through said pulley means to transmit the motion of said moving means to the body thereby immersing the body in said fluid;

means for measuring a representation of the change in sid volume displaced by the body per unit time as the body is immersed between respective ones of said points within said tank; and means for calculating quotients of said measured change and said predetermined rate;

wherein said quotients correspond to the cross-sectional area of the body between the selected points along its length.

5. The apparatus according to claim 4, wherein said measuring means comprises:

a scale, said weighted object being disposed upon said scale;

means for outputting a change in weight detected by said scale; and means for outputting said predetermined rate.

6. The apparatus according to claim 5, wherein said calculating means comprises a digital computer receiving said change in weight and said predetermined rate from said outputting means.

* * * * *